Aug. 18, 1953 — L. S. HANNIBAL — 2,649,203
METHOD AND APPARATUS FOR DISSOLVING SOLUTES IN LIQUIDS
Filed Aug. 22, 1949 — 2 Sheets-Sheet 1
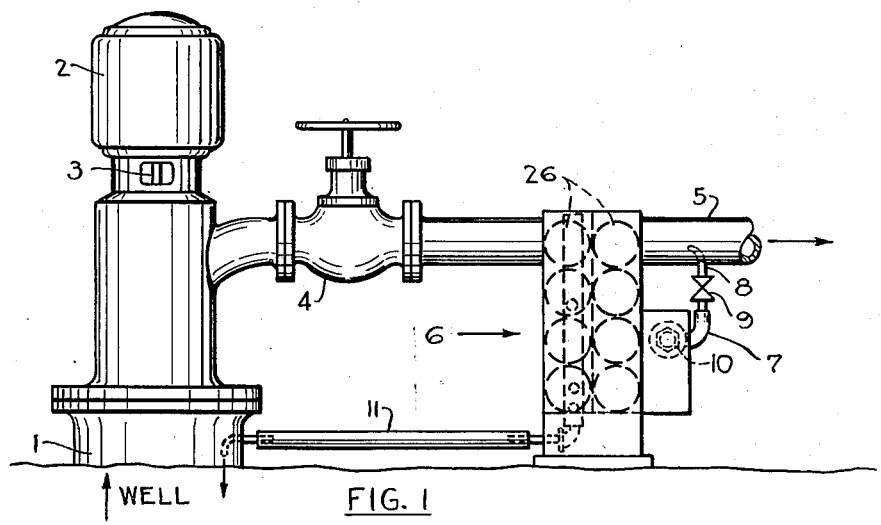
FIG. 1
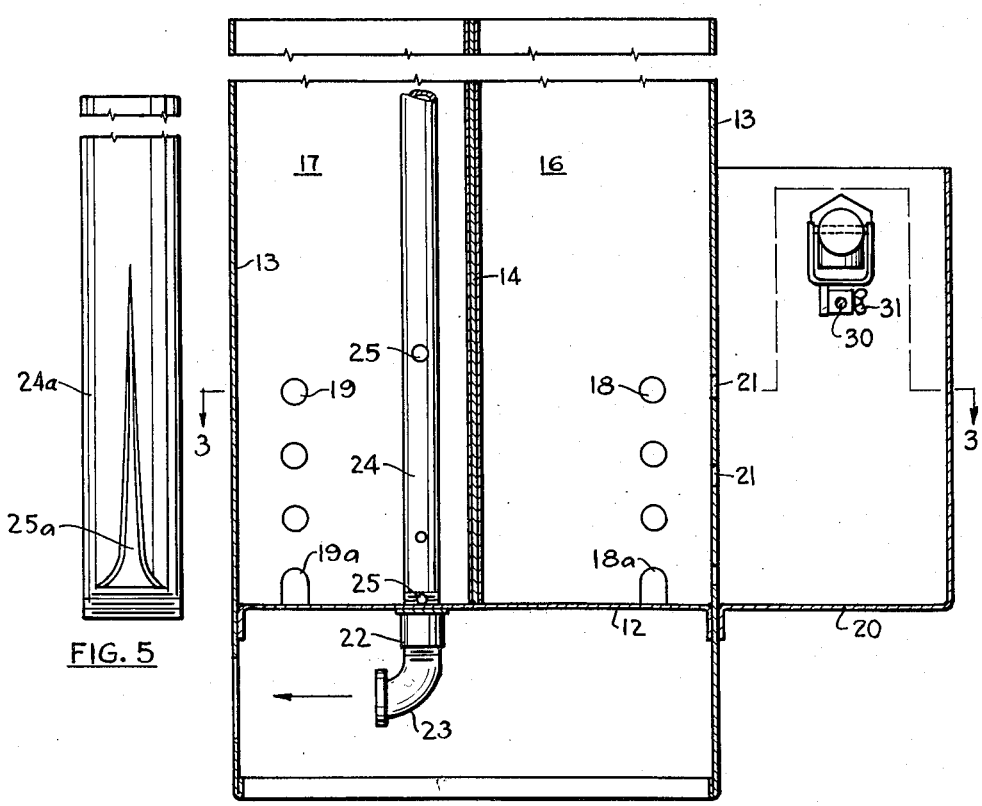
FIG. 5
FIG. 2
INVENTOR:
LESTER S. HANNIBAL
BY: Oswald H. Milmore
HIS ATTORNEY Aug. 18, 1953    L. S. HANNIBAL    2,649,203
METHOD AND APPARATUS FOR DISSOLVING SOLUTES IN LIQUIDS
Filed Aug. 22, 1949    2 Sheets-Sheet 2

INVENTOR:
LESTER S. HANNIBAL
BY: *Oswald H. Wilmore*
HIS ATTORNEY

Patented Aug. 18, 1953

2,649,203

UNITED STATES PATENT OFFICE 2,649,203

METHOD AND APPARATUS FOR DISSOLVING SOLUTES IN LIQUIDS

Lester S. Hannibal, Concord, Calif., assignor to Shell Development Company, San Francisco, Calif., a corporation of Delaware Application August 22, 1949, Serial No. 111,646

11 Claims. (Cl. 210—30)

This invention relates to the art of continuously dissolving a solid substance in a stream of liquid at a controlled rate, e. g., at a rate dependent upon the flow of the stream. More particularly, the invention is concerned with an improved method and apparatus for dissolving a soluble solid substance such as a chemical treating agent, in the liquid at relatively low concentrations, i. e., well below the concentration at which a saturated solution of such solid substance is formed, and for controlling the rate of solution either manually or automatically in accordance with the rate of flow of the liquid stream.

One specific example of the application of the invention is the addition to irrigation water of chemicals, such as inhibitors against the deposition of lime in irrigation canals, ditches, pipe lines, flumes, valves and the like. Such deposition is especially troublesome when hard water is treated with basic substances such as ammonia for soil fertilization because they lower the pH of the water and cause calcium carbonate to be precipitated. It has for many years been common to add inhibitors, such as various sodium metaphosphates, in small amounts from less than one to a few parts per million to the irrigation water. For example, water containing 420 p. p. m. (parts per million) of calcium carbonate and 300 p. p. m. of ammonia can be inhibited against precipitation of lime for fifteen minutes by adding 1 p. p. m. of sodium hexametaphosphate or sodium heptametaphosphate, while 2 p. p. m. of the inhibitor will stabilize such water for approximately twice that time.

To date standard practice in irrigation work has been to make up a 15% aqueous solution of the inhibitor, e. g., sodium hexametaphosphate, place it in a five-gallon stainless steel applicator can and meter it by means of a small glass or stainless steel capillary tube into the well from which the irrigation water is pumped, or into the flowing irrigation water some distance prior to the point of addition of ammonia to insure thorough mixing with the water. The usual threshold treatment ranges from 0.5 to 2 p. p. m. of the inhibitor.

Such a treatment is expensive and precautions must, for this reason, be taken to avoid overdosing. Difficulty has been experienced in attaining uniform flow rates of the aqueous inhibitor solution through the capillary tubes because of wide temperature fluctuations; flow at 110° F. may be twice that at 45° F. The preparation of the aqueous solution in proper concentration is also difficult to supervise in the field, where the work is performed by unskilled labor. To avoid the highly objectionable deposition of lime due to occasional low concentrations of inhibitor in the aqueous solution or reduced flow rates thereof through the capillary tubes there has been a general tendency on the part of operators to overtreat the water generously; in fact, some servicemen dispense with the capillary tubing entirely and set the petcock under the tank to drip at what they consider a convenient rate.

Also, it was found that many servicemen failed to shut off the applicator at night or during shutdowns, resulting in a waste of inhibitor and frequently depleting the supply. Failure of the applicator due to depletion of the solution or to failure of the operator to turn it on when the irrigation pumps are started have been common.

It is an object of the invention to provide an improved method of dissolving a soluble substance in a liquid and an improved apparatus therefor, wherein the rate at which the substance is dissolved is automatically controlled by the flow of liquid through the dosing chamber. Such a method and apparatus, while particularly useful in the application of inhibitors to irrigation water, are not limited thereto but may be applied to other purposes, such as, for example, the addition of corrosion and scale inhibitors or after softening agents to boiler feed water.

It is a further object to provide an improved liquid dosing method and device of the type indicated wherein the rate of addition of the solute or treating agent to the liquid stream can be adjusted as desired; wherein the rate of addition of the treating agent can be made to vary automatically with the rate of flow of the liquid; and wherein no further treating agent will be dissolved after the stream of liquid is stopped.

A further object is to provide an improved dosing device of the type which is charged with solid blocks of solute material, e. g., in the shape of balls, and is self-replenishing, wherein the tendency of the blocks to adhere to the enclosing walls by "bridging" is minimized.

Still another object is to provide a dosing device which is of simple and inexpensive construction and which is self-replenishing, whereby it is capable of operation in the field for extended periods of time without attention.

It is already known to dissolve chemicals in water by flowing water through a vessel containing chemicals in solid form. An example of this is described in the U. S. Patent to Paige, No. 1,592,126. The known devices do not, however, provide for or permit an accurate control of the rate of solution; further, they are generally not self-replenishing, and as the supply of solute material is depleted an effluent solution of progressively lower concentration is produced if the rate of liquid flow is kept uniform.

Now in accordance with the instant invention the liquid stream is flowed continuously through one or through a series of dosing chambers containing the solute material in solid form, such as pressed balls, blocks, pellets or granules, throughout a substantial height above the floor of the chamber, and is withdrawn therefrom at a restricted rate so as to cause some of the liquid to back up in the dosing chamber and maintain therein a liquid level above the bottom of the chamber. The solid solute material will thereby be wetted to a height which will increase or decrease as the liquid level is increased or decreased. Since low concentrations of the solute are dealt with, the rate at which the solute material dissolves in the liquid will be approximately proportional to the wetted area thereof, this area being, in turn, approximately proportional to the height to which the solute material is wetted by the water. It is evident that the solute material will be dissolved at a rate which is determined by liquid level.

The liquid level is controlled in any of several ways, e. g., by passing the inflowing liquid through a feed tank connected to dosing chamber and provided with a float-controlled inlet valve to maintain a constant liquid level. The level can be varied by adjusting the level at which the inlet valve shuts off, or by throttling the outlet pipe from the closing chamber; or it may be varied automatically in accordance with the rate of liquid flow through the dosing chamber by arranging the discharge from the chamber with a constriction which permits the outflow of liquid only at a rate which is governed by the head of the liquid within the dosing chamber.

To insure a more uniform rate of solution it is desirable to provide compartmentation for the dosing chamber and to flow the liquid successively through a series of dosing compartments which are interconnected to permit the free flow of liquid in a forward direction, but the flow passages are preferably small enough to prevent back-flow against the direction of the current. The openings must, of course, be small enough to prevent the flow of the solid material therethrough. According to a further preferred feature the resulting liquid solution is discharged from the dosing compartment into a separate outlet compartment through a plurality of openings, so as to withdraw a representative solution from the dosing chamber.

The walls of the dosing chamber extend above the liquid level which prevails in the normal operation of the device and form chutes for containing a reserve supply of the solid solute material which descends as the supporting solute material at the bottom of the chamber is dissolved in the liquid, thereby automatically replenishing the dosing chamber. In the preferred embodiment, wherein use is made of large blocks of solute material, such as balls, extending for the greater part of the horizontal distance between the walls, difficulty is sometimes encountered by "bridging" between the walls; this may be prevented by making the horizontal distances between the walls only slightly greater than the corresponding dimensions of the blocks, thereby preventing diagonal stacking of the blocks in the chutes.

Depending upon the concentration of the treating agent desired, all or a partial side stream constituting a minor part of the main stream may be passed through the dosing device. The former embodiment being a self-evident variant of the latter, only the latter will be described in detail herein.

The invention will be described in detail with reference to the accompanying drawing forming a part of this specification, wherein:

Figure 1 is an elevation view of an installation applied to an irrigation system drawing water from a well;

Figure 2 is a longitudinal section of the dosing device taken on vertical planes indicated by broken line 2—2 on Figure 3;

Figure 5 is an elevation view of a modified outlet pipe.

Figure 3:
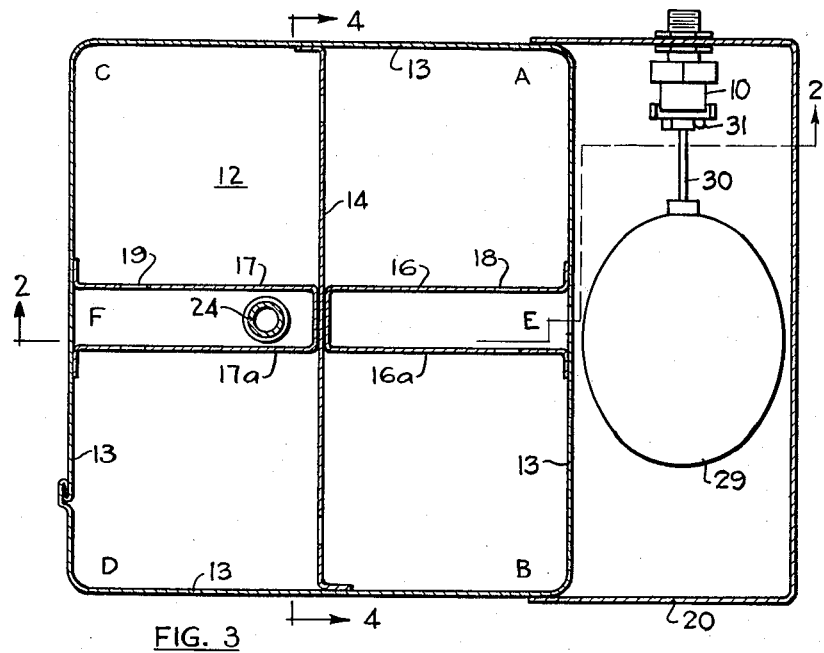
Figure 3 is a section taken on horizontal planes indicated by broken line 3—3 on Figure 2.

Referring to Figure 1 of the drawings, 1 indicates the top of a well having a deep well pump (not shown) driven by an electric motor 2 through a shaft 3 and having its discharge through a valve 4 into the main pipe 5. The dosing device, indicated generally by number 6, is connected by a flexible tube 7 to an inlet 8 in the main pipe 5. The inlet 8 may be a Pitot tube of the "duck bill" type disposed to take advantage of the flow of the water in the pipe 5 even when low pressures in the pipe are encountered. A manually-operated shut-off valve 9 and a float-controlled valve 10 are connected in series, the former being fully open during operation of the device and the latter being used to control the rate of flow. The side stream of the water which enters the dosing device is dosed therein with a treating agent and discharged through a pipe 11 into the well, where it becomes intimately mixed with the water pumped therefrom.

Figure 4:
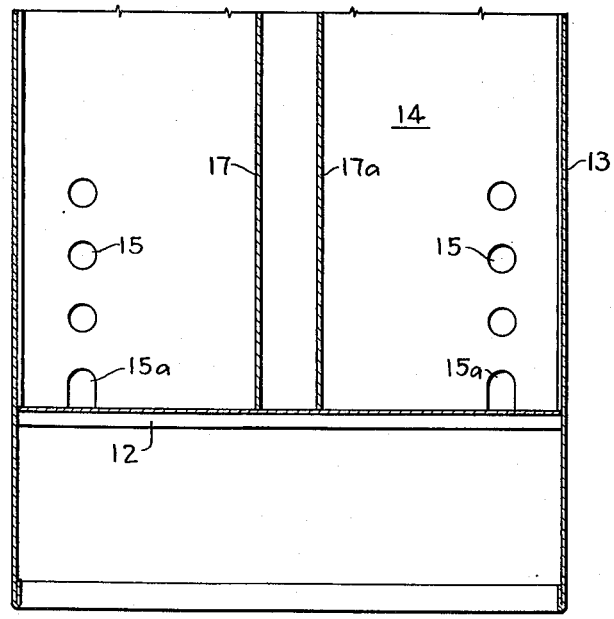
Figure 4 is a fragmentary transverse section on a vertical plane indicated by line 4—4 on Figure 3.

The dosing device, shown in detail in Figures 2–4, may be constructed of any material, and the soldered sheet-metal construction to be described is merely exemplary. The metal is preferably coated corrosion-resistant material. The device has a floor 12 and four vertical outer side walls 13 extending both above and beneath the floor to enclose a space which is open at the top. A transverse partition 14 extends from the floor to the top and divides the space into an inlet end (at the right) and an outlet end (at the left); it has a plurality of vertically spaced holes 15, the lowermost hole 15a being formed as a notch and extending entirely to the floor. A pair of longitudinal baffles are fitted within each end; the baffles 16 and 16a are in the inlet end and the baffles 17 and 17a in the outlet end. Each pair may be formed of a single piece of sheet metal bent to the general shape of a horizontal U with edges bent outwardly to permit attachment to the end walls 13 by soldering. The baffles 16 and 16a subdivide the inlet end into inlet dosing compartments A and B and a water feed compartment E; the baffles 17 and 17a subdivide the outlet end into outlet dosing compartments C and D and a water discharge compartment F. These baffles have a plurality of vertically spaced holes 18 and 19, the lowermost holes 18a and 19a being formed as notches extending to the floor. The baffles extend to the floor but need not be sealed thereto.

A feed tank 20 is attached to the inlet side of the device and is in flow communicaton with the water feed compartment E through a plurality of holes 21 in the end wall 13. The valve 10 is mounted within the feed tank. A short, internally threaded pipe 22 is brazed to the floor of the water discharge compartment F and has an elbow 23 for connection to the pipe 11. A discharge pipe 24 having constricted holes 25 through its wall at various levels, is threaded into the top of the pipe 22. It should be noted that the lowermost hole 25 is at the floor 12 to permit water to drain from the dosing device. The other holes are spaced so that the total rate of discharge from the compartment F into the pipe is approximately proportional to the height of the liquid level above the floor 12. The top of the pipe is open and acts as an overflow in the event that the holes 25 are for any reason obstructed.

The holes 25 in pipe 24 provide constricted passageways disposed to pass liquid at different levels above the bottom of the chamber, progressively higher holes become cumulatively effective to discharge liquid as the liquid level in the compartment rises. Thus, the lowermost hole will pass liquid at a rate proportional to its area and to the square root of the height of the liquid. When the level has risen to the second hole, the latter begins to pass liquid at a rate proportional to its area and to the height of the liquid above the second hole, so that the total flow is the sum of the flows through these holes. While the flow through each hole does not have a linear relation to the liquid height, the total flow can be made to approach such a linear relation to any desired degree by using a sufficiently large number of holes. The arrangement shown in the drawing was found in practice to result in a total flow which was sufficiently near to being proportional to the height for most purposes.

When a more precise linear relation is desired, it may be desirable to employ an inverted notch, which may be continuous or discontinuous. Thus, in Figure 5 there is shown a modified discharge pipe 24a having an orifice in the form of an inverted notch 25a, the width of the notch being such that, $w\gamma h$ is a constant, where $w$ is the width of the notch at any level $h$ above the floor. (See Mark's Mechanical Engineer's Handbook, fourth ed., page 262.)

As a result of the arrangement of the discharge openings in the pipe 24 or 24a liquid will back up in the dosing chambers A, B, C and D to a level which rises as the rate of water flow is increased, and which falls as such rate is decreased; the level will be approximately proportional to the rate of flow. However, it is evident that such proportionality is not in every case essential, depending upon the requirements of the process to which the dosing device is put, and that the holes may be arranged in some other manner so as to provide for any desired relation between the liquid level and the rate of flow.

The solid solute material, such as sodium hexametaphosphate, may be pressed into solid balls 26 and stacked within the dosing compartments A, B, C and D as indicated in dotted lines in Figure 1. In the specific embodiment shown large balls, which may have diameters of several inches, only slightly smaller than the sides of the dosing compartments, are used. This relation of sizes is important when using certain types of solute material, such as sodium hexametaphosphate to avoid diagonal stacking of the balls and consequent bridging. Such bridging was found to cause the balls to adhere to the side walls, thereby preventing the downward feeding of the ball column which, in turn, defeated the purpose of attaining a uniform rate of feed. It was found by experience that, when using such balls, the compartments should not exceed the 3⅜ in. ball diameters by more than about ¼ to ⅜ in. Such balls present surfaces of relatively stable dimensions and are preferred, although it is evident that blocks of other shapes or even pellets or granular material may be used. The holes 15, 18 and 19 and their corresponding notches must, of course, be small enough to retain the solid. The solid material extends to the top of the compartments considerably above the normal level of the liquid during operation, so that only the lower part of the body of solid is normally wetted and exhausted by being dissolved in the water. The solute material is self-replenishing by moving downwardly as the lowermost parts are dissolved.

The valve 10 is controlled by a float 29 having a stem 30 which is adjustably connected to the valve by means of a clamp 31, so that the liquid level within the feed tank 20 may be adjusted.

In operation, with valves 4 and 9 fully open and the float 29 adjusted to maintain a desired level within the feed tank 20, a side stream from the pipe 5 is diverted through the feed tank and flows through the holes 21 into the feed compartment E. From there it flows laterally through the holes 18 and 18a into the inlet dosing compartments A and B, where some of the solid is dissolved in the water. The water then flows through the holes 15 and 15a into the outlet dosing compartments C and D, wherein additional solute material is dissolved. By arranging for flow of the water through two dosing compartments in series, i. e., A and C or B and D, there is less chance of channelling or short-circuiting, i. e., withdrawing water which has not had an opportunity to come into contact with the solid. From the latter dosing compartments the water flow through the holes 19 and 19a into the water discharge compartment F, passing from there into the pipe 24 through the holes 25. The holes 15, 18 and 19 are large enough to result in only a minor difference between the levels in the several compartments.

When the pump motor 2 is stopped flow of water ceases and the water drains from the dosing device through the notches 15a, 18a and 19a and through the lowermost hole in the pipe 24, whereby further solution of the treating agent in the water ceases.

It is evident that water will flow through the dosing device at a uniform rate which is determined by the level within the feed tank 20 which can, in turn, be adjusted by adjustment of the float 29. Such a mode of operation is preferred in irrigation practice, where the variations in pressure within the pipe 5 do not vary proportionally with the rate of water used, and/or the rate of water flow is more or less uniform.

In some applications, however, variations in the rate of flow of water through the pipe 5 will cause a corresponding change in the flow of water through the Pitot tube 8. In such cases it is possible to omit the float 29 and float-controlled valve 10, and use the valve 9 to throttle the side stream so as to pass through the dosing device a stream which is more or less proportional to the flow of water in the main pipe 5. It is evident that in this case the liquid level within the dosing compartments will rise or fall depending upon the rate at which the deep well pump is operated, so that the amount of solute fed into the well through pipe 11 is proportional to the main flow. Such operation without a float-controlled valve would also be used in instances where the total stream of water is passed through the dosing device.

It is evident that the device can also be used for dissolving several solute materials, and that different chemicals can be placed in the different dosing compartments.

I claim as my invention:

1. A method of continuously dosing a liquid by dissolving therein a solute material in a concentration below saturation concentration comprising the steps of maintaining a body of said solute material in solid form throughout a substantial height within a confined dosing chamber; admitting liquid to be dosed continuously into said chamber; wetting said solute material with said admitted liquid up to the level of the liquid in the said chamber; and withdrawing liquid containing solute in concentration below saturation from said dosing chamber continuously from one or more points beneath the liquid level at a rate that increases with the head of liquid in said chamber, said rate being restricted to maintain within said chamber a liquid level that rises as the rate of liquid flow through the chamber increases, said level being below the top of said body of solute material, whereby the height to which said body of material is wetted is increased as the rate of liquid flow increases.

2. A method of continuously dosing irrigation water with small amounts below saturation concentration of an inhibitor against lime deposition comprising the steps of maintaining a body of said inhibitor in solid form throughout a substantial height within a confined dosing chamber; admitting water to be dosed continuously into said chamber at a controlled rate; wetting said inhibitor with the admitted water to a level dependent upon the water level in the chamber; and withdrawing water containing inhibitor in concentration below saturation from said chamber continuously by gravity from one or more points beneath the water level at a rate that increases with the head of water in the dosing chamber, said rate being restricted to maintain within said chamber a water level that rises as the rate of water flow through the chamber increases, whereby the height to which said body of inhibitor is wetted is increased as the controlled rate of water flow increases.

3. A method of continuously dosing a liquid by dissolving therein a solute material in a concentration below saturation concentration comprising the steps of maintaining a plurality of bodies of said solute material in solid form throughout substantial heights within a plurality of separate dosing chambers interconnected at different levels by small flow passages; admitting liquid to be dosed continuously into a first of said chambers; transferring liquid continuously by gravity flow from said first chamber through said small flow passages at different levels into a second of said chambers, whereby the liquid level in said first chamber rises and falls with the liquid level in the second chamber; wetting said bodies of solute material in each of said chambers with said liquid up to the respective levels therein; and withdrawing liquid containing solute in concentration below saturation from the second chamber continuously at a restricted flow rate such as to maintain within said dosing chambers liquid levels that rise as the rate of liquid flow through said chambers increases, said levels being below the tops of said bodies of solute material, whereby the heights to which said bodies of solute material are wetted is increased as the rate of liquid flow increases.

4. A method of dosing irrigation water continuously with small amounts from less than one to a few parts per million of an inhibitor against lime deposition which comprises flowing a main stream of irrigation water through a flow element; withdrawing from said main stream a side stream which forms a minor part of said main stream; maintaining a body of said inhibitor in solid form throughout a substantial height within a confined dosing chamber; admitting said side stream of water continuously into said dosing chamber; wetting said body of inhibitor with the admitted water to a level determined by the water level in said chamber; withdrawing water containing inhibitor in concentration below saturation from said dosing chamber from one or more points beneath the water level at a rate that increases with the head of water in the dosing chamber, said rate being restricted to maintain within said chamber a water level that rises as the rate of flow of said side stream increases, whereby the height to which said body of inhibitor is wetted is increased as the flow of said side stream increases; and admitting the dosed, withdrawn water to water in said main stream.

5. The method according to claim 4 wherein the said side stream is, prior to admission into said dosing chamber, flowed into a separate feed tank; the rate of flow of said side stream is regulated to maintain in said feed tank a constant water level; and the water is flowed from said feed tank by gravity into said dosing chamber at the water head determined by said constant water level.

6. The method according to claim 4 wherein the said side stream is withdrawn from said main stream at a rate approximately proportional to the rate of flow of said main stream, whereby the height to which said body of inhibitor is wetted by the water is increased as the rate of flow of said main stream increases.

7. A liquid dosing device for continuously dissolving a solid solute material in a stream of liquid comprising a vessel vented to the atmosphere and having a bottom and side walls forming a dosing chamber adapted to contain solid solute material throughout a substantial height above the bottom thereof; an inlet for admitting said stream of liquid into the dosing chamber; an outlet means including one or more restricted passageways situated at levels to pass liquid at different levels above said bottom of the dosing chamber and beneath the top of said solute material, at least one of said passageways being situated substantially at the bottom of said chamber, whereby progressively higher parts of said outlet means become cumulatively effective to discharge liquid as the said liquid level in the chamber rises, to maintain in said chamber a liquid level above said bottom that rises with the rate of flow of said stream, whereby solid solute material in said chamber will be wetted to an increased height as the rate of flow of said stream increases.

8. A liquid dosing device for continuously dissolving a solid solute material in a stream of liquid comprising a vessel vented to the atmosphere and having a bottom and side walls forming a dosing chamber adapted to contain solid solute material throughout a substantial height above the bottom thereof; an inlet for admitting said stream of liquid into the dosing chamber; and an outlet including an overflow pipe extending to above the bottom of the dosing chamber to a substantial height therein and having a plurality of constricted orifices for admitting liquid into the overflow pipe, the sizes and heights of said orifices being such that the liquid level within the dosing chamber is maintained at a distance above the bottom of the chamber which is approximately proportional to the rate of flow of said stream, said level being beneath the top of said solute material, whereby solid solute material in said chamber will be wetted to an increased height as the rate of flow of said stream increases.

9. A liquid dosing device for continuously dissolving a liquid solute material in a stream of liquid comprising a vessel vented to the atmosphere and having a bottom and side walls forming a dosing chamber adapted to contain solid solute material throughout a substantial height above the bottom thereof; an inlet for admitting said stream of liquid into the dosing chamber; an outlet communicating with said chamber substantially at the bottom thereof for discharging said stream from the chamber; and means including a flow restriction in said outlet for limiting the rate of efflux through said outlet to a rate which rises as the height of the liquid level in said chamber rises, said restriction being smaller than said inlet for maintaining in said chamber a liquid level above said communication of the outlet which level is beneath the top of said solute material and rises as the rate of flow of said stream increases, whereby solid solute material in said chamber will be wetted to an increased height as the rate of flow of said stream increases.

10. A liquid dosing device for continuously dissolving a solute material in a stream of liquid comprising: a plurality of vessels, each vessel having bottom and side walls providing separate dosing compartments; a body of said solid solute material within each of said dosing compartments extending to a substantial height above the bottom thereof; a feed tank situated at a level that includes the lower part of said dosing compartments; an inlet to said feed compartment for admitting said stream of liquid; adjustable liquid-level responsive flow control means for said inlet for controlling the flow of said stream into said compartment to maintain an adjustable predetermined level therein, said level being below the top of said body of solid solute material; a free communication between said feed tank and a first of said dosing compartments for admitting liquid from the feed tank into said first dosing compartment substantially the level of said predetermined level in the feed tank; flow communication means for transferring liquid from said first compartment to the successive compartment or compartments for flow through the said compartments in series, said means being adapted to maintain substantially the same liquid level in the several compartments, whereby the solute material in each compartment is wetted to a predetermined level below the top thereof; outlet means for discharging said stream from the dosing compartment that is last in said series; and means including a flow restriction in said outlet means for maintaining liquid within said compartments to said predetermined level.

11. A liquid dosing device for continuously dissolving a solute material in a stream of liquid comprising a plurality of vessels, each vessel having bottom and side walls providing separate dosing compartments extending to a substantial height above the bottom thereof; an inlet for admitting said stream of liquid into a first of said compartments; flow communication means for transferring liquid from said first compartment to the successive compartment or compartments for flow through said compartments in series, said means including at their upstream sides with their respective compartments substantially at the bottoms thereof to permit substantially complete drainage of liquid therefrom; outlet means for discharging said stream from the dosing compartment that is last in said series, said outlet means communicating with said last compartment substantially at the bottom thereof to permit substantially complete drainage of liquid therefrom; and means for controlling the liquid level in said compartments to regulate the height to which said solute material is wetted at a height beneath the top of said solute material, said means including a flow restriction in said outlet means limiting the rate of efflux to a rate that increases as the said liquid level rises, whereby the said liquid level is maintained at a height above said communication of the outlet means with the last compartment.

LESTER S. HANNIBAL.

References Cited in the file of this patent

UNITED STATES PATENTS

| Number | Name | Date |
|---|---|---|
| 441,989 | Stott | Dec. 2, 1890 |
| 885,902 | Wooding | Apr. 28, 1908 |
| 976,665 | Ledoux | Nov. 22, 1910 |
| 1,592,126 | Paige | July 13, 1926 |
| 2,034,796 | Chandler | Mar. 24, 1936 |
| 2,162,277 | Chandler | June 13, 1939 |
| 2,177,243 | Chandler | Oct. 24, 1939 |
| 2,471,158 | Livingstone | May 24, 1949 |
| 2,503,878 | Linn | Apr. 11, 1950 |
| 2,532,973 | Wallentin et al. | Dec. 5, 1950 |
| 2,550,387 | Shoaf | Apr. 24, 1951 |

FOREIGN PATENTS

| Number | Country | Date |
|---|---|---|
| 251,826 | Great Britain | May 13, 1926 |